July 12, 1932.  H. V. HARDING  1,867,453
DRIVE FOR LIMIT SWITCHES AND THE LIKE
Filed May 27, 1927  3 Sheets-Sheet 2
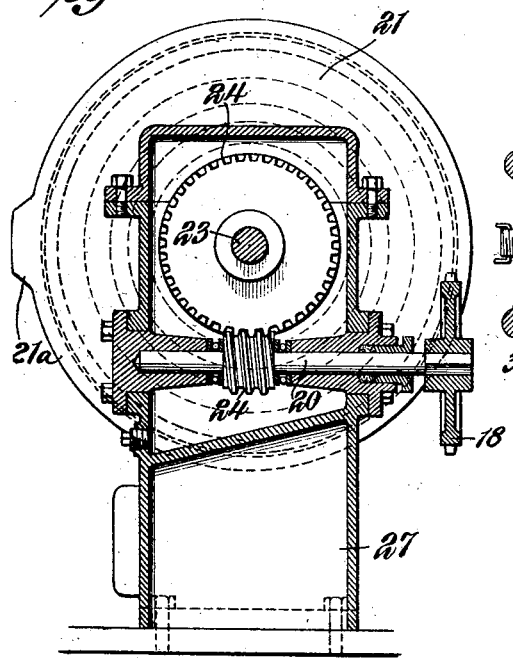
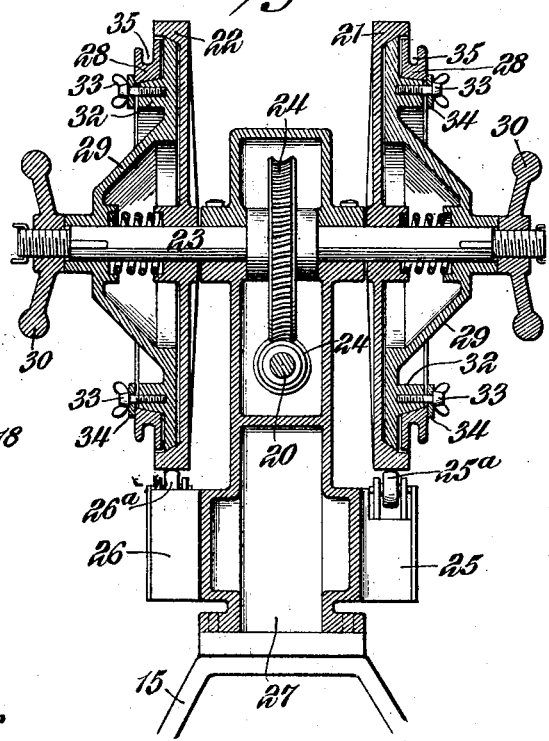
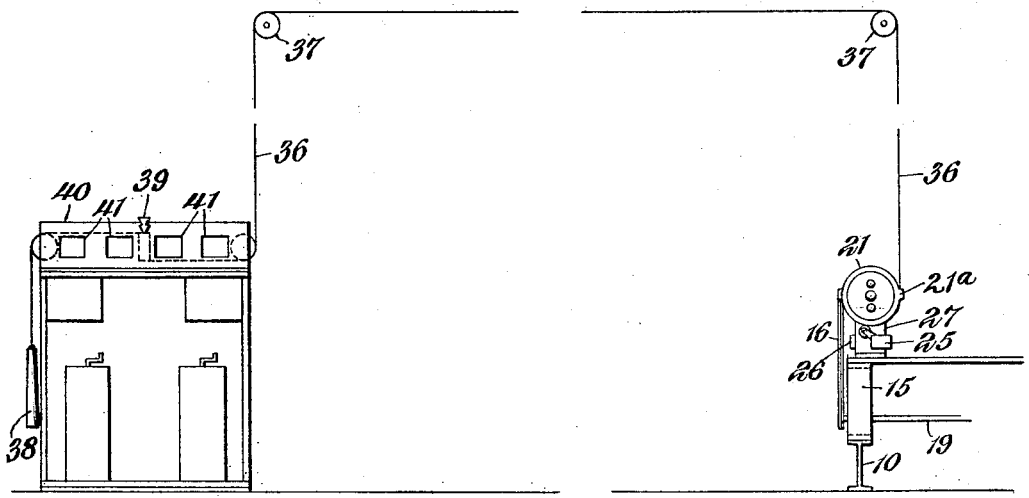
Howard V. Harding, INVENTOR,
BY
ATTORNEY July 12, 1932. H. V. HARDING 1,867,453
DRIVE FOR LIMIT SWITCHES AND THE LIKE
Filed May 27, 1927   3 Sheets-Sheet 3

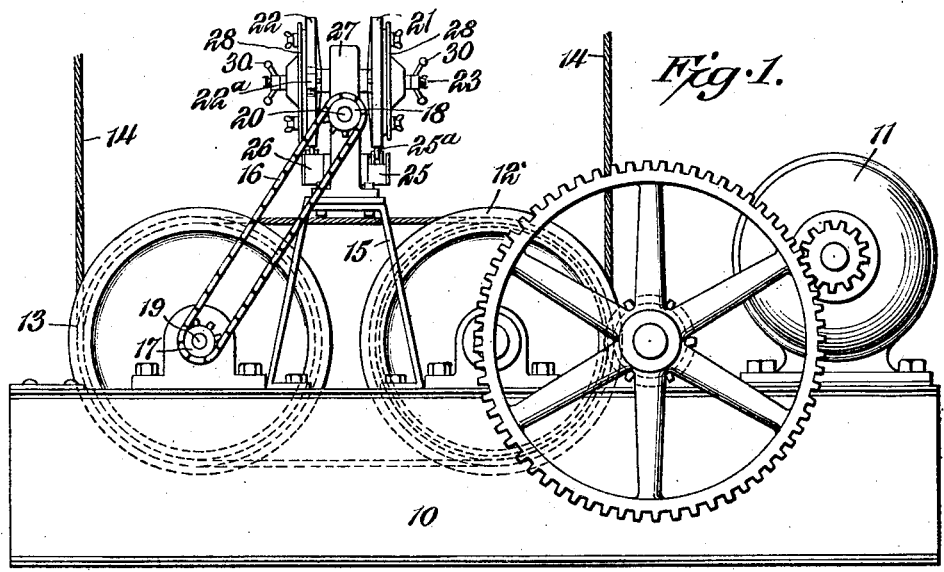
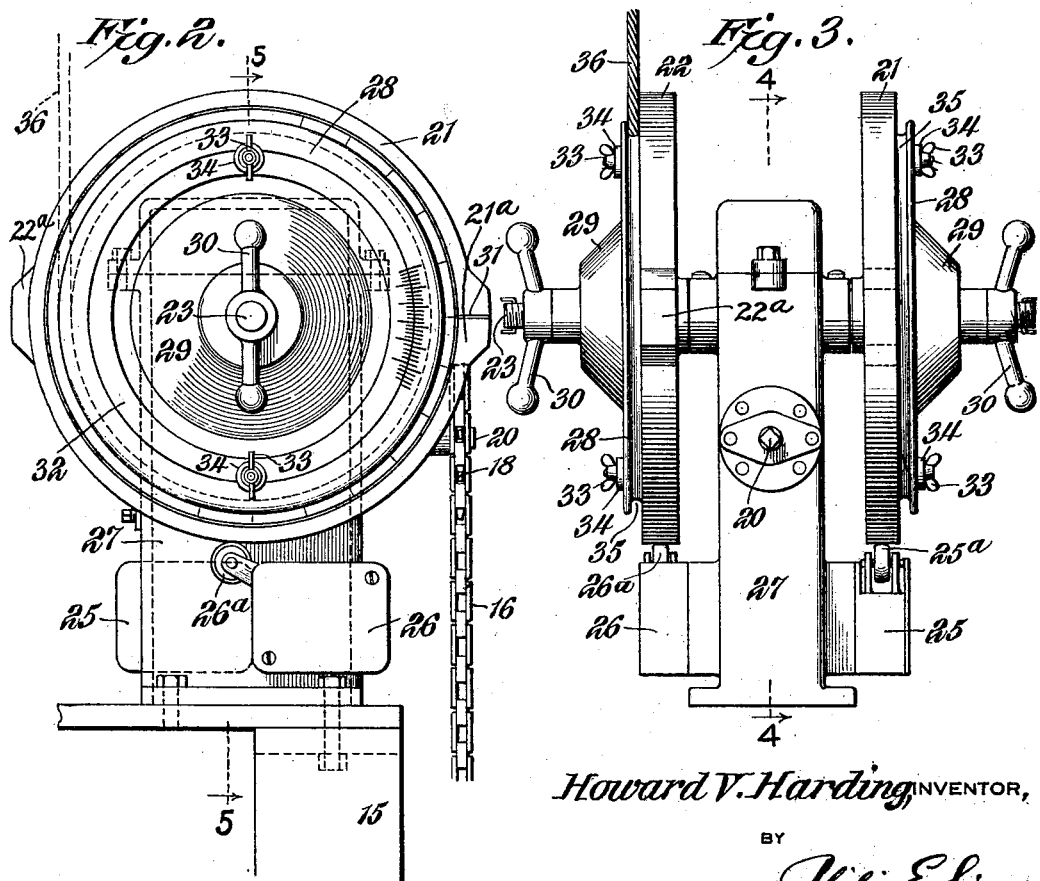

Inventor
Howard V. Harding
By
Philip C. Liggus
Attorney

Patented July 12, 1932

1,867,453

UNITED STATES PATENT OFFICE

HOWARD V. HARDING, OF HUDSON, NEW YORK, ASSIGNOR TO GIFFORD-WOOD COMPANY, OF HUDSON, NEW YORK, A CORPORATION OF NEW YORK

DRIVE FOR LIMIT SWITCHES AND THE LIKE

Application filed May 27, 1927. Serial No. 194,842.

This invention relates to driving mechanism of the speed reducer type, useful for driving limit switches and the like; and among other objects, the invention aims to provide a driving mechanism which may be adjusted both initially, to suit conditions at an installation, and after use, to correct errors; also a drive for an indicator so constructed and arranged that the indicator may be adjusted simultaneously with the driving mechanism. The invention provides a slowly driven member which may be used to actuate a series of limit switches controlling the hoisting and/or traverse movements of a trolley bucket or the like.

In the pending application of H. E. Hallenbeck, Ser. No. 491,534, filed October 27, 1930, assigned to the assignee of this application, the device of the present invention is shown slightly modified so as to control both the hoist and trolley units, and the necessary wiring and electrical control apparatus are also shown therein.

The accompanying drawings show a preferred embodiment of the invention.

In the drawings:

Fig. 1 is an elevation of a "trolley" unit, with a slow-speed drive which embodies the invention arranged to actuate limit switches controlling the motor of the unit;

Fig. 2 is an elevation on an enlarged scale of the slow-speed driving mechanism, viewed from the left side of Fig. 1;

Fig. 3 is a side elevation of the same;

Fig. 4 is a section on line 4—4 of Fig. 3;

Fig. 5 is a section on line 5—5 of Fig. 2;

Fig 6 is a diagram showing how the mechanism is connected to the indicator;

Figure 7:
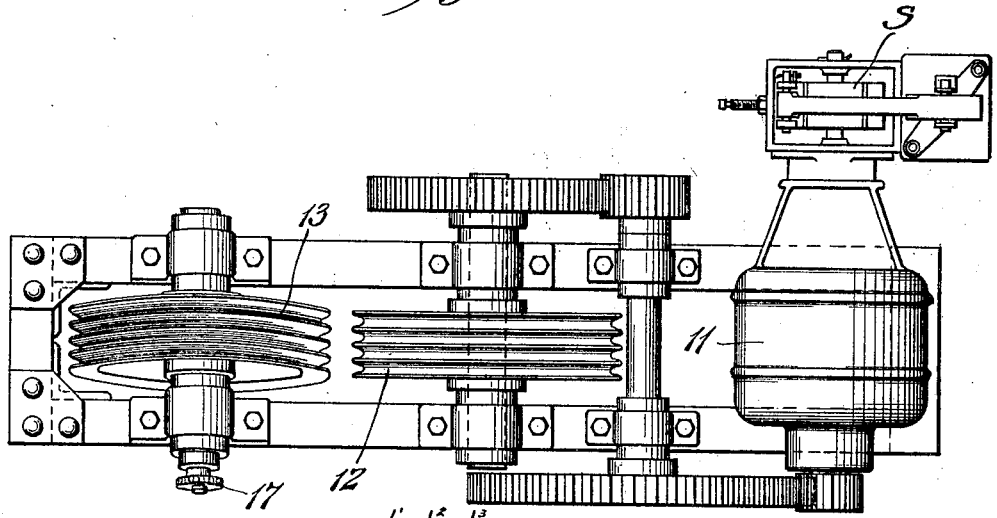
Fig. 7 is a top plan view of the trolley unit shown in Fig. 1, omitting the trolley rope and the limit switch actuator, but showing the solenoid brake.

In Fig. 1 the illustrative unit shown is a trolley unit, for moving the trolley of a traversing hoist back and forth along a track. and comprises a base 10, a motor 11, a grooved drum 12 geared to the motor, an idler drum 13 likewise grooved and a trolley rope 14 which extends to the trolley (not shown) from which the bucket (not shown) hangs. The idler drum derives its motion solely from the rope and hence stops and starts with the rope which is always under considerable tension and is directly connected with the opposite ends of the trolley. The idler drum is a far better element than the power driven drum to actuate the limit switches because there is practically no slip of the trolley rope on the idler and therefore, adjustments need be made very infrequently to have the limit switches stop the motor at the proper times.

The limit switch actuating mechanism shown in the drawings is mounted on a bracket 15 (Fig. 1) adjacent to the idler drum 13 and is driven from the shaft of said drum by a sprocket chain 16, the sprockets 17, 18 being selected to give the desired reduction of speed between the shafts 19 and 20 to suit the installation. Obviously a long traverse (or a high hoist) will require a greater reduction than a short one if the same standardized mechanism is to be used for all installations.

The limit switch driving mechanism specifically comprises two rotary cams 21, 22 loosely mounted on but adapted to be frictionally clutched to the shaft 23, which is driven by worm gearing 24 from the shaft 20. See Figs. 4 and 5. The two limit switches 25, 26 are preferably mounted on the housing 27 which supports the driving mechanism and are of standard construction, being so made as to open the circuit of the motor 11 whenever either of the cam projections 21a, 22a comes in contact with the corresponding limit switch roller 25a, 26a. As soon as the motor circuit is opened, the motor is stopped by a solenoid brake S, (Fig. 7) which quickly brings the trolley rope 14 to rest, resulting in stopping of the trolley and the depending bucket or other hoist means.

It is highly desirable that both the limit switches and the indicator be adjustable so as to be accurate. If the indicator is inaccurate, the operator (who is usually so placed that he cannot see the bucket) will be unable to lower the bucket at the desired point. This will result in injury to the bucket as, for example, if it strikes against a concrete wall.

The limit switches must act at the proper times, else the bucket either will be stopped too soon or not soon enough. If the bucket is stopped too soon, the operator may not be able to lower it at the desired point for discharge of its load or for taking on a new load; or, if the bucket is lowered, it may crash into a bin wall or other obstruction. If the bucket is not stopped soon enough, it will probably crash into a wall or into the superstructure which supports the elevated track along which the bucket travels, resulting in serious damage to the bucket and probable shut-down of the plant. It is also highly desirable to adjust the limit switch actuating mechanism and the indicator simultaneously; or in other words, to correct any errors in each to the same extent and at the same time. By the present invention I accomplish these desiderata.

To facilitate adjustment of the limit switch actuating means, I provide the cams 21, 22 in the form of circular plates or disks each of which is dished and beveled (Fig. 5). In the description to follow, but one of the cams and associated parts will be described, since both sides of the mechanism are alike. The cam plate 21 receives a soft metal annulus 28 (Fig. 5) which is carried by a cone 29 clamped on the plate 21 by a nut 30 screw-threaded on the end of the shaft 23. The cone 29 is keyed to the shaft 23 so as to be rotated thereby, and has a beveled periphery to fit the beveled surface provided on the dished cam plate 21, thus driving cam plate 21 when the nut 30 is tightened. By loosening the nut 30 the cone is freed from frictional engagement with the surrounding cam plate 21 and the cam plate 21 may then be turned on shaft 23 relative to the cone 29. To facilitate nice adjustment of the cam plate 21, it may have a radial notch 31 (Fig. 2) in the central part of the cam enlargement 21a; and when the mechanism is set to operate properly for a particular installation, at the time the installation is first put in use, a mark may be cut in the outer surface of the soft metal annulus 28, said mark being alined with the notch 31. Then the same adjustment will be made with the other annulus and cam.

It is necessary to make adjustments of the same degree on both sides of the mechanism, as the bucket or other hoisting means travels the same distance in both directions and any correction made to govern the travel in one direction must also be made to govern the travel in the opposite direction.

After the installation has been in use for a time, due to the cumulative effect of repeated slight slippage of the trolley rope 14 on the idler 13, the limit switches may stop the motor too soon when the bucket is going in one direction and not soon enough when the bucket is moving in the opposite direction. An adjustment is now necessary and may be easily effected by loosening one of the nuts 30 and moving the cam plate around to the desired extent. The soft metal annulus 28 may be easily scratched to indicate the new setting which is to be tested. If the new setting is unsatisfactory, a further trial may be made. When the proper adjustment is made on one side of the mechanism, exactly the same adjustment may be obtained on the other side by measuring from the initial mark to the last mark made on the soft metal annulus. This measurement may be made conveniently by calipers or dividers. When both adjustments are exactly the same, as they should be, the bucket or other material handling means will stop at exactly the right point, when traveling in both directions.

The described adjustment must be made because of movement of the rope 14 relative to the drum 13. Such movement is usually cumulative in effect because of sudden stoppage of a loaded bucket continually being moved in one direction only, the bucket usually traveling empty in the opposite direction. However, there is a further adjustment desirable and in some instances necessary, due to what is known as "creepage" of the rope. This "creepage" is believed to be due to the wear of the rope and also to wear of the grooves in the drum and may possibly be due to a slight untwisting of the strands of the wire rope. Whatever the cause or causes of the "creepage", it cannot be prevented by any known means. Hence, I have provided a further adjustment by permitting the soft metal annulus 28 to be moved relative to the cone which carries it. As shown in Figs. 2 and 5, the annulus 28 has a tapered inner surface frictionally engaging the frusto-conical surface provided on a boss 32 integral with the cone 29. Screws 33 are used to clamp the annulus 28 to the cone with washers 34 interposed between the screws and the annulus. To permit the operator to measure the extent of this secondary adjustment, small scales may be fixed adjacent each other to the annulus and boss, as indicated in Fig. 2.

While an indicator is not necessary, it is usually highly desirable, particularly when the hoist is operated by one man who is not in a position to see the bucket at all times. If an indicator is used, it is best driven from the cam. For this reason each annulus 28 may have an annular groove 35 to receive a wire rope 36 which extends over a series of guiding pulleys 37 indicated diagrammatically in Fig. 6, to a heavy weight 38 shown in the same figure. Thus the rope 36 is kept under constant tension. A pointer 39 will be secured to the tensioned rope 36 at any desired point and said pointer may travel across a board 40 bearing indicia 41 showing the points where the bucket may ascend and descend to receive and discharge its loads. When the pointer comes opposite one of the indicia 41, the operator will bring the bucket to rest by shutting off the current to the motor, and will then hoist or lower the bucket. It will be clear that as the annulus 28 is always secured to the cone 29, which is keyed to the shaft 23, the indicator pointer will have no movement relative to the shaft except when the described adjustment for "creepage" is made. This is as it should be because when the limit switch driving means is not properly adjusted because of "creepage" the indicator is also out of adjustment and should be moved to the same extent.

The specific indicator shown in Fig. 6 is described and claimed in my Patent No. 1,705,973.

Figure 8:
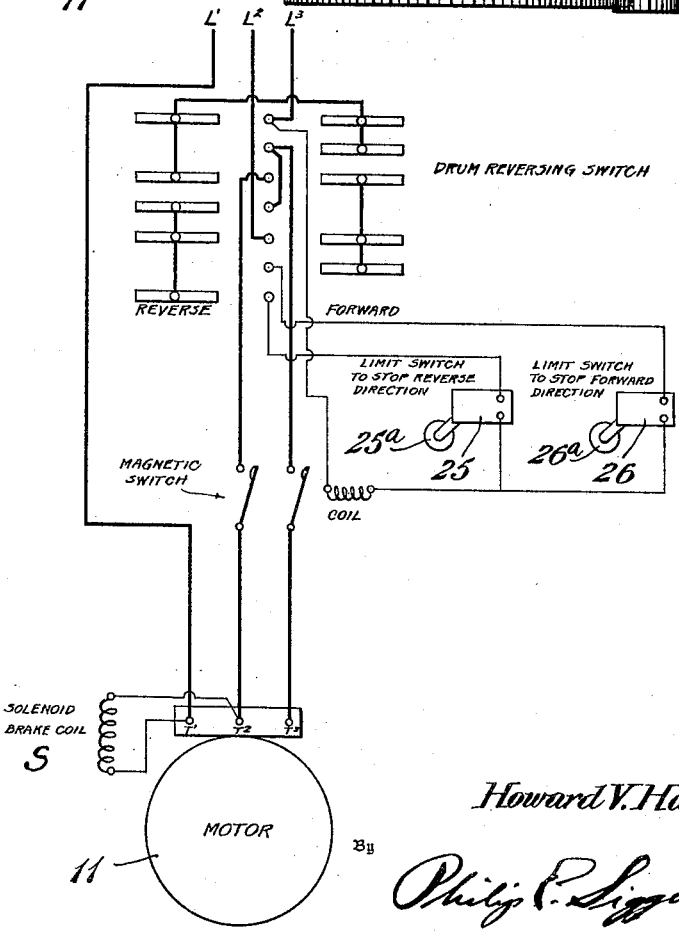
Fig. 8 is a wiring diagram.

When the bucket or other material-carrier is to be moved horizontally in its traverse, the operator moves the drum switch shown in Fig. 8 (or closes some other standard form of switch) thus completing the motor circuit. The magnet of the solenoid brake S immediately pulls apart the brake shoes, in the well known manner, thus permitting the motor to start. The drums 12 and 13 immediately start revolving, thus causing the trolley rope 14 to move at a linear speed equal to the peripheral speed of drum 12. As the trolley (not shown) is attached to both ends of rope 14, and as the bucket is suspended from the trolley by the hoist line (not shown), the bucket is moved beneath the track (not shown) by which the trolley is supported. Rotation of idler drum 13 effects an extremely slow oscillation (partial revolution) of slow speed shaft 23, and hence of cam plates 21, 22. One of the cams, say cam 21$^a$, is so arranged angularly with respect to shaft 23 that it comes in contact with roller 25$^a$ of limit switch 25 shortly before the bucket reaches the desired limit of travel (which limit may be over one of a series of bins, or over a storage pile or over a pit or pocket in which the bucket is loaded). As the limit switch opens, the motor circuit is opened, as will be clear from Fig. 8; and when the circuit is open, the magnetic coils of the solenoid brake S are de-energized, whereupon the armature shaft of the motor is braked and the motor, drums, rope, trolley and bucket are quickly brought to rest. After an interval of lowering and hoisting, traverse is resumed, but now in the other direction, and this time the other cam 22$^a$ opens the other limit switch 26.

It will be clear that while only one limit switch is shown actuated by each cam, more than one may be so actuated, as shown in the above-indentified Hallenbeck application. Also the limit switches 25, 26 and/or their duplicates may be used to control hoisting as well as traverse movements and otherwise may govern the operation of a bucket or other material-handling element.

Obviously the present invention is not restricted to the particular embodiment thereof herein shown and described. Moreover, it is not indispensable that all the features of the invention be used conjointly, since they may be employed advantageously in various combinations and subcombinations.

What I claim is:—

1. A traversing hoist comprising, in combination, a motor; a drum driven by the motor; a second drum on a countershaft; a traverse rope wound about both drums and driving the second drum; a set of limit switches connected in the motor circuit; means driven by the shaft of the second drum for actuating the limit switches; an indicator constructed and arranged to indicate the traverse of the rope; and connections between the indicator and the limit switch actuating means, said connections being so constructed and arranged that adjustment of said actuating parts also properly adjusts the indicator.

2. A traversing hoist, comprising, in combination, a motor; a grooved drum driven by the motor ; a second grooved drum on a countershaft; a traverse rope wound about both drums and driving the second drum; a set of limit switches connected in the motor circuit; means driven by the shaft of the second drum for actuating the limit switches; means to adjust said limit switch actuating means; and an indicator driven from the means for actuating the limit switches so that when the adjustment of the corresponding limit switch actuating means is made, the indicator will be adjusted to an equal extent.

3. A traversing hoist comprising, in combination, a power-actuated traverse rope connected to the material-handling element of the traversing hoist; a speed-reducing mechanism driven by said rope; a limit switch; means driven by the speed-reducing mechanism to actuate the limit switch; and means to adjust the position of the limit switch actuating means relative to the speed-reducing means, thereby to compensate for slippage of the rope relative to the speed-reducing mechanism.

4. A traversing hoist comprising, in combination, a power-actuated traverse rope connected to the material-handling element of the traversing hoist; a speed-reducing mechanism driven by said rope; a limit switch; means driven by the speed-reducing mechanism to actuate the limit switch; means to adjust the position of the limit switch actuating means relative to the speed-reducing means, thereby to compensate for slippage of the rope; an indicator driven by the speed-reducing mechanism; and means to adjust for "creepage" of the rope, said means also simultaneously adjusting the indicator because of the connection between the indicator and the mechanism aforesaid.

5. A mechanism for actuating limit switches and the like, comprising, in combination, a reduction gearing; a shaft driven at a slow speed by the reduction gearing; a disk-like member rotated by the shaft; a cam carried by the disk-like member, and arranged so as to actuate a limit switch once during each revolution of the disk-like member; and means to adjust the cam angularly relative to the disk-like member to cause actuation of the limit switch at the proper time.

6. A mechanism of the character described, comprising, in combination, a pair of limit switches; a reduction gearing; a shaft driven at a slow speed by the reduction gearing; and two disk-like cam members secured axially upon the shaft to be rotated thereby one cam associated with each switch thereby to cause actuation of the two limit switches as the shaft is rotated in opposite directions.

7. A mechanism for actuating limit switches and the like, comprising, in combination, a reduction gearing; a shaft driven at a slow speed by the reduction gearing; two like cam members secured upon the shaft to be rotated thereby to cause actuation of two different limit switches as the shaft is rotated in opposite directions; nuts screw-threaded upon opposite ends of the shaft; and means clamped by the nuts to hold the cams in adjusted positions.

8. A mechanism for actuating limit switches and the like, comprising, in combination, a reduction gearing; a shaft driven at a slow speed by the reduction gearing; a disk-like member rotated by the shaft; an annulus provided upon the disk-like member; a cam carried by the disk-like member, and arranged so as to actuate a limit switch once during each revolution of the disk-like member; and means to adjust the annulus angularly relative to the disk-like member.

9. A mechanism for actuating limit switches, and the like, comprising, in combination, a reduction gearing; a shaft driven at a slow speed by the reduction gearing; a disk-like member rotated by the shaft; a cam carried by the disk-like member, and arranged so as to actuate a limit switch once during each revolution of the disk-like member; an indicator; and power-transmitting means connecting the disk-like member and indicator so that as the shaft rotates the indicator is moved correspondingly.

10. A traversing hoist comprising, in combination, a motor; the pair of drums one driven by the motor, a second being an idler drum on a countershaft; a traverse rope wound about both drums and driving the second drum; a set of limit switches connected in the motor circuit and actuated by the shaft of the second drum; an indicator; connections between the indicator and the limit switch actuating means; and means to adjust the connections in the event of "creepage" of the traverse rope on the second drum.

11. A traversing hoist comprising, in combination, a speed-reducing mechanism; a limit switch; means driven by the speed-reducing mechanism to actuate the limit switch; said means including a cam, a shaft, and means to clamp the cam to the shaft, the shaft being driven at low speed by the speed reducing mechanism.

12. A mechanism for actuating limit switches and the like, comprising, in combination, a reduction gearing; a shaft driven at a slow speed by the reduction gearing; a disk-like member rotated by the shaft; a cam carried by the disk-like member, and arranged so as to actuate a limit switch once during each revolution of the disk-like member; and means to press the disk-like member forcefully against the cam to clutch the cam thereto, said means permitting any angular movement of the cam about the shaft as an axis to permit adjustment of the mechanism.

13. The combination of a power driven rope attached to a materials-handling device to move the same; a speed-reducing mechanism driven by the rope; an indicator; and means connecting said mechanism with said indicator; said means having an adjustable part to which the indicator is attached, so that adjustment of the mechanism also sets the indicator right.

14. An actuator for limit switches and the like comprising, in combination, a power driven shaft provided with screw-threads; a plate loosely mounted on the shaft; a member secured to the shaft against rotation but movable longitudinally thereof; a nut engaging with the screw-threads on the shaft and moving said member against the plate to clamp the two parts together; and an annulus mounted on the member and independently clamped thereto so as to permit angular adjustment.

15. An actuator for limit switches and the like comprising, in combination, a power driven shaft provided with screw-threads; a plate loosely mounted on the shaft and having an annular beveled surface; a member secured to the shaft against rotation but movable longitudinally thereof and having a beveled periphery to frictionally engage the beveled surface on the plate; a nut engaging with the screw-threads on the shaft and moving said member against the plate to clamp the two parts together; and an annulus mounted on the member and independently clamped thereto so as to permit angular adjustment, said annulus having a grooved periphery to receive a rope.

16. The combination of a traverse rope for a traversing hoist; a speed reducing mechanism driven directly from the rope; a traverse motor for driving said rope in opposite directions; a pair of limit switches in the motor circuit; limit switch actuating means driven from the speed-reducing means; and a solenoid brake for stopping the motor whenever the motor circuit is opened by one of the limit switches.

17. In combination, an electric, reversible motor having a solenoid brake; a drum driven by said motor; a second idler drum; a traverse rope wrapped about both drums and connected with the material-handling member of a traversing hoist so as to move said member in opposite directions as the motor is reversibly driven; reduction gearing driven by said idler drum; a pair of limit switches in the motor circuit; and a pair of cams driven by said reduction gearing and actuating said limit switches alternately to stop the motor after predetermined rotation in opposite directions.

18. The combination of a rope for moving a material-handling element; a winding drum for moving the rope; an electric motor for driving said drum in opposite directions; a pair of limit switches in a motor-controlling circuit; a solenoid brake for stopping the motor; a speed-reducing unit, comprising a slow speed shaft and a disk on said shaft, driven by the motor; a pair of cams on the periphery of the disk and angularly adjustable with respect to the slow speed shaft of the speed-reducing unit; said cams being moved, as the disk oscillates, into contact with the respective limit switches, thereby opening the motor circuit and causing the solenoid brake to stop the motor and drum, at or near the desired limits of travel of the material-handling element.

In testimony, that I claim the foregoing as my own, I have hereto affixed my signature.

HOWARD V. HARDING.